United States Patent
Borowski et al.

(10) Patent No.: US 11,245,985 B2
(45) Date of Patent: Feb. 8, 2022

(54) ARCHITECTURE FOR USB-SYNCHRONIZED ARRAY OF SPEAKERS

(71) Applicant: Microsoft Technology Licensing, LLC, Redmond, WA (US)

(72) Inventors: Christopher Ian Borowski, Bellevue, WA (US); Kevin Juho Venalainen, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/367,082

(22) Filed: Mar. 27, 2019

(65) Prior Publication Data
US 2020/0314539 A1 Oct. 1, 2020

(51) Int. Cl.
| | |
|---|---|
| H04R 3/12 | (2006.01) |
| H04N 7/14 | (2006.01) |
| H04N 21/43 | (2011.01) |
| H04N 21/439 | (2011.01) |
| H04R 1/40 | (2006.01) |
| H04R 3/14 | (2006.01) |

(52) U.S. Cl.
CPC .............. *H04R 3/12* (2013.01); *H04N 7/142* (2013.01); *H04N 7/147* (2013.01); *H04N 21/4302* (2013.01); *H04N 21/439* (2013.01); *H04R 1/403* (2013.01); *H04R 3/14* (2013.01); *H04R 2420/09* (2013.01)

(58) Field of Classification Search
CPC .... H04R 3/12; H04R 2420/09; H04N 21/439; H04N 21/4307; G06F 2213/0042
See application file for complete search history.

(56) References Cited

U.S. PATENT DOCUMENTS

| | | | |
|---|---|---|---|
| 5,761,537 A | 6/1998 | Sturges et al. | |
| 2004/0015597 A1* | 1/2004 | Thornton | G06F 3/0227 709/231 |
| 2009/0222685 A1* | 9/2009 | Foster | G06F 1/12 713/500 |

(Continued)

OTHER PUBLICATIONS

"Synchronizing Multiple USB Devices with a Broadcast Command", Retrieved From: https://www.microchip.com/forums/m329799.aspx, Apr. 13, 2008, 9 Pages.

(Continued)

*Primary Examiner* — Thomas H Maung

(57) ABSTRACT

A host device is connected via universal serial bus (USB) connections to one or more external devices with respective speakers. The host device synchronizes playback of audio through the speakers of the USB-connected external devices by requiring devices to implement a deterministic latency between receipt of a start playback request, and requiring devices to slave their audio clocks to USB start-of-frame tokens, and determining a buffered start time for starting data transmission to the respective USB devices. The buffered time equates to the current time of the USB host plus an additional time buffer. The host device waits until the buffered start time, and then starts transmitting the audio stream to the external devices, which, in turn, begin playing the audio data on the next available clock cycle, frame, or microframe.

20 Claims, 7 Drawing Sheets

(56) References Cited

U.S. PATENT DOCUMENTS

| | | | |
|---|---|---|---|
| 2012/0185627 A1* | 7/2012 | Lin | G06F 13/362 |
| | | | 710/116 |
| 2014/0059267 A1* | 2/2014 | Lai | G06F 13/4059 |
| | | | 710/313 |
| 2014/0344490 A1 | 11/2014 | Tsfaty et al. | |
| 2015/0032797 A1* | 1/2015 | Pan | H04L 65/607 |
| | | | 709/203 |
| 2017/0364401 A1* | 12/2017 | Huang | G06F 11/0748 |

OTHER PUBLICATIONS

"Universal Serial Bus Specification Revision 2.0", Retrieved From: http://sdphca.ucsd.edu/Lab_Equip_Manuals/usb_20.pdf, Apr. 27, 2000, 650 Pages.

"International Search Report & Written Opinion Issued in PCT Application No. PCT/US20/022873", dated Jun. 15, 2020, 14 Pages.

* cited by examiner

ARCHITECTURE FOR USB-SYNCHRONIZED ARRAY OF SPEAKERS

BACKGROUND

Speakers are being included in more and more devices in the personal computing era. When a user has multiple audio speakers attached to a single audio source, such as a personal computer (PC), the user typically only selects one group speakers to be used, either by default or for specific applications. For example, a user's computer may be connected to internal computer speakers, external wireless speakers, television speakers, stereo speakers, and a whole host of external speakers. Today, computers are equipped with several input/output ports for wired connections and drivers for wireless connections (e.g., BLUETOOTH®, ZIGBEE®, and the like), extending the capability of conventional computers to easily connect with external speaker systems that facilitate various needs. A user may wish to hear audio for a video chat out of the PC's speakers, listen to music through a separate wireless speaker, and listen to television through television speakers—while all of these speaker systems are connected to the user's PC.

As device form factors change in the computing industry, next-generation technology has started moving applications off of the PC and onto larger monitor-like displays (e.g., the SURFACE HUB™ manufactured by the MICROSOFT CORPORATION® headquartered in Redmond, Wash.). These intelligent monitors include a host of multimedia applications and their own set of stereo speakers, and the monitors can typically be connected to each other to create an immersive user experience. Several monitors may be connected together along a wall, and video may be across all of the interconnected monitors to resemble a single, larger screen. With each interconnected monitor having its own speakers, creating an immersive audio experience for the corresponding video extended across interconnected monitors becomes challenging.

Management of large arrays of speakers are typically only found in the professional audio space. But such configurations typically have specialized hardware that distributes a clock source from a single point out to each speaker/amplifier/device that is part of a signal chain. Conventionally, the clock is distributed using digital data transmission methods that embed clock signals in a master-slave configuration such as Integrated Inter-IC Sound Bus (I2S), Sony/Phillips Digital Interface (SPDIF), or the like. Traditionally, these configurations use timecodes (e.g., Society of Motion Picture and Television Engineers (SMPTE) timecodes) to control a clock across multiple speakers. These techniques require specialized hardware that is both expensive and requires a skilled installer/operator, making them impractical and non-intelligent for the masses. As such, these approaches are typically limited to commercial or other high-cost venues.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Some aspects and examples disclosed herein are directed to synchronizing audio played through speakers of universal serial bus (USB) external devices that are individually connected to a computing device through USB connections. A USB host device includes memory storing executable instructions for directing, over the USB connections, synchronized playback of audio through the speakers of the USB external devices. In operation, the USB host device detects the USB external devices over the USB connections and identifies the speakers in the detected USB external devices. The USB host device also transmits USB-related Start of Frame (SOF) tokens to the USB external devices to enable the USB external devices to slave their respective audio clocks and synchronize audio playback. A buffered start time, relative to the SOF tokens, is determined by the USB host device for starting playback of the audio stream. The buffered start time is set based on the current frame or microframe of the USB host device plus an additional time buffer. The USB host device transmits a start playback as well as audio data of the audio stream at the buffered start time to enable the USB external devices to synchronize playback of the audio stream through the speakers of the USB external devices.

BRIEF DESCRIPTION OF THE DRAWINGS

The disclosed examples are described in detail below with reference to the accompanying drawing figures listed below.

DETAILED DESCRIPTION

Figure 1:
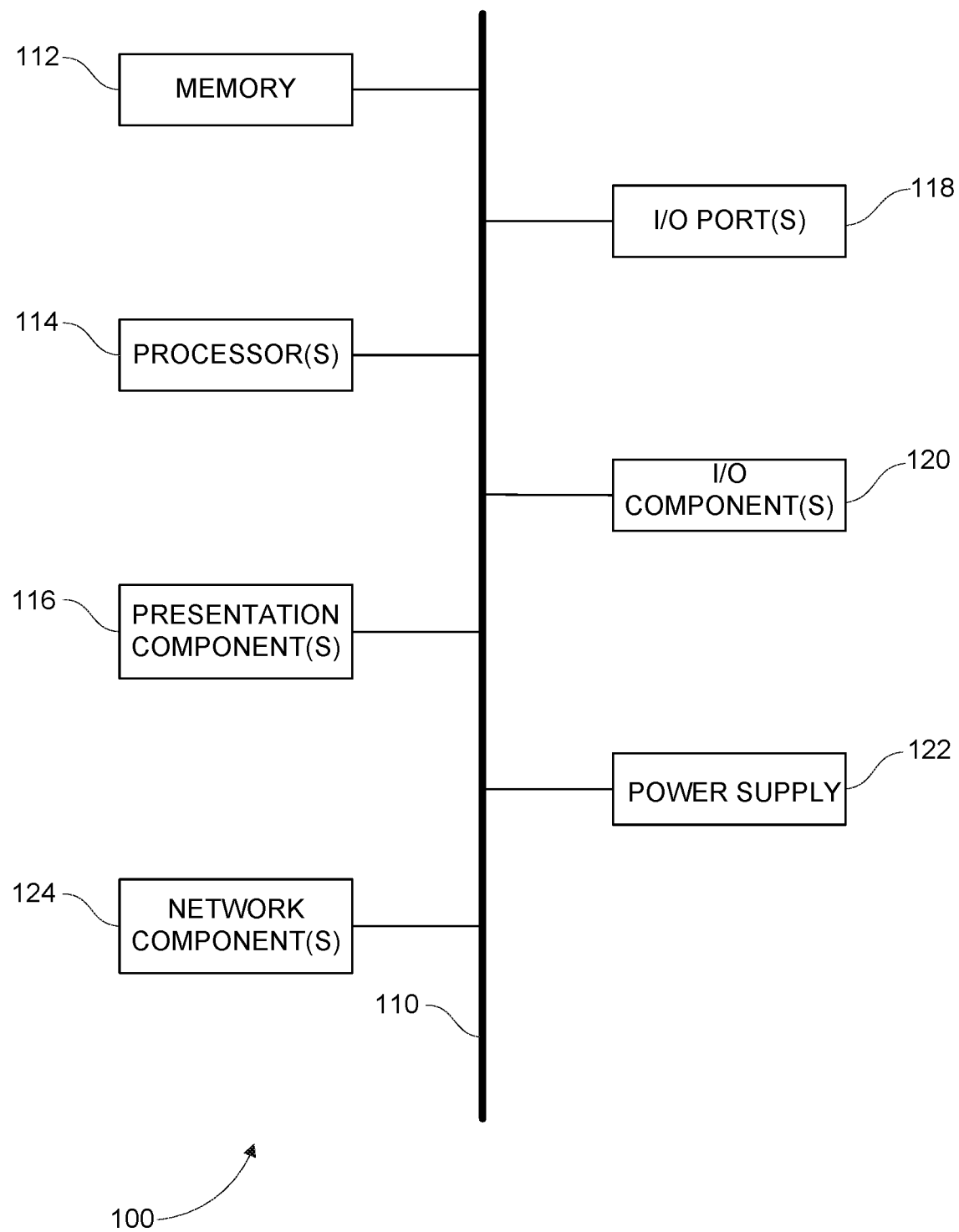
FIG. 1 is a block diagram of an example computing environment suitable for implementing the various examples disclosed herein.

The various embodiments will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

The human ear is very efficient at detecting directionality in audio. So any multi-speaker configurations must expertly blend audio across different speakers. If all the speakers from disparate devices are meant to play the same audio synchronously, they must play the audio in phase with each other, or the human ear will detect directional differences.

For example, audio from one speaker that is out of phase with audio from another speaker may result in the user perceiving the sound as if they are standing to the side of the device, despite being centered in front. So audio playing from different speakers must be played in the same phase to avoid panning effects, which lead to poor user experiences. Additionally, audio must be played at the same rate from each of the speakers. If not, one audio stream will finish being played before another, and an unsoundly silence, or pop, depending on the conditions, may be created. Thus, it is crucial in multi-speaker arrangements—especially across separate devices—to effectively synchronize playback on designated speakers both in the same phase and at the same rate.

An architecture is disclosed herein for effectively synchronizing audio across multiple speakers on the separate devices. Synchronous playback of audio across the different speakers not only leads to better user listening experience, but it also provides the basis for performing more complicated audio blending across various speakers of multiple devices. Blending audio across multi-device speaker setups cannot be performed until the speakers are set to play audio synchronously with one another. For example, a setup with three devices with two speakers each cannot assign leftmost, rightmost, and center speakers (with a little less left- and right-directional audio) without first synchronizing the audio streams across the three separate devices and their six speakers.

Examples disclosed herein generally relate to the intelligent synchronization of speakers in external devices, across USB connections. A host computing device (referred to herein as a "USB host device") is connected, via USB, to one or more external devices with their own speakers (referred to herein as "USB external devices"). The USB host device retrieves a host of USB Audio Class parameters of the USB external devices, including, for example but without limitation, the devices' respective synchronization mode (synchronous, asynchronous, or adaptive); number of speakers; different audio channels; device identifier, device manufacturer; and the like. In some examples, only USB external devices that operate in the synchronous mode of operation are used for speaker synchronization, and once identified (through the retrieved USB Audio Class parameters), these available synchronous-mode USB external devices are then intelligently synchronized by the USB host device to prepare them for synchronous playback of an audio stream.

To intelligently synchronize audio playback across the disparate USB external devices, the USB host device establishes a master audio clock based on the particular USB protocol being used for communications between the USB host devices and the USB external devices (e.g., USB 1.0, 2.0, 3.0, etc.). In some examples, the master audio clock is determined based on SOF tokens of the USB audio class. The USB host devices transmits the SOF tokens for the master audio clock to the USB external devices, and the USB external devices slave their respective audio clocks to using the SOF tokens from the USB host device.

Additionally, the USB host device identifies the speakers on the USB-connected USB external devices and configures audio data to be sent to them. Either all or a select group of the available speakers on the USB external devices may be selected based on the application playing the audio and/or the operating system of the USB host device. Mixing of the audio data may be applied as well, e.g., some audio data for some speakers may be given more left-channel audio, center-channel audio, or right-channel audio.

The USB host device synchronizes playback of the audio data to the USB external devices by calculating a buffered start time based on the SOF tokens of the master audio clock (based on frame or microframe numbers) and adds a time buffer thereto. The buffered start time may be preset or dynamically generated (e.g., based on data sets of recorded audio playback of different USB external devices). The USB host device waits until the buffered start time and then transmits the audio data to all of the USB external devices simultaneously, triggering the USB external devices to play received audio data on the next clock cycle or frame/microframe.

For clarity, an "audio stream" refers to audio that is to be played on end devices. Examples include audio associated with a video or video chat, music files, gaming audio, or generally any sound to be played on speakers of the USB external devices referred to herein. Audio streams may either be streamed from outside sources or stored locally on the disclosed audio devices.

The disclosed examples refer to various speaker configurations and USB devices that are configured and transmit data according to one or more USB and USB Audio Class standards. The disclosed examples may operate in accordance with the USB 1.0, 2.0, 3.0, and beyond as well as USB Audio Class 1.0, 2.0, 3.0, and beyond. In general, the referenced USB connections transport data according to the USB standard, and the various USB speaker and device parameters are referenced according to the USB Audio Class standards.

This disclosure references several examples that incorporate "intelligent monitors." An intelligent monitor, as described herein, refers to a multimedia smart board, computing device, interactive whiteboard, or the like, having a larger form factor than a laptop computer, such as for instance the size of a 36 inch or larger television. Intelligent monitors may wall-mounted or situated on a stand, and may also include a touch-screen or natural user interface that allows a user to interact with multimedia applications (e.g., video chat, 3D modeling, whiteboard applications, videos, audio, gaming, and the like). An example of an intelligent monitor is the SURFACE HUB™ manufactured by the MICROSOFT CORPORATION®.

FIG. 1 is a block diagram of an example computing device 100 for implementing aspects disclosed herein is shown and designated generally as computing device 100. Computing device 100 includes a bus 110 that directly or indirectly couples the following devices: memory 112, one or more processors 114, one or more presentation components 116, input/output (I/O) ports 118, I/O components 120, a power supply 122, and a network component 124. Computer device 100 should not be interpreted as having any dependency or requirement related to any single component or combination of components illustrated therein. While computer device 100 is depicted as a single device, multiple computing devices 100 may work together and share the depicted device resources. For instance, memory 112 may be distributed across multiple devices, processor(s) 114 may provide housed on different devices, and so on.

Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component 120. Also, processors have memory. Such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," "intelligent monitor," "tablet," etc., as all are contemplated within the scope of FIG. 1 and the references herein to a "computing device."

Memory 112 may include any of the of the computer-readable media discussed below in the section captioned "Exemplary Operating Environment." Memory 112 may be used to store and access instructions configured to carry out the various operations disclosed herein. In some examples, memory 112 includes computer-storage media in the form of memory devices, such as volatile and/or nonvolatile memory, removable or nonremovable memory, data disks in virtual environments, virtual memory, or a combination thereof.

Processor(s) 114 may include any quantity of processing units that read data from various entities, such as memory 112 or I/O components 120. Specifically, processor(S) 114 are programmed to execute computer-executable instructions for implementing aspects of the disclosure. The instructions may be performed by the processor, by multiple processors within the computing device 100, or by a processor external to the client computing device 100. In some examples, the processor 114 are programmed to execute instructions such as those illustrated in the flowcharts discussed below and depicted in the accompanying drawings. Moreover, in some examples, the processor(s) 114 represent an implementation of analog techniques to perform the operations described herein. For example, the operations may be performed by an analog client computing device 100 and/or a digital client computing device 100.

Presentation component(s) 116 present data indications to a user or other device. Exemplary presentation components include a display device, touch screen, speaker, printing component, vibrating component, etc. Computer data may be presented in a number of ways, such as visually in a graphical user interface (GUI) or natural user interface (NUI), audibly through speakers, using haptics, or via peripheral devices (e.g., headphones, remotes, external sensors, etc.), or the like.

Ports 118 allow computing device 100 to be logically coupled to other devices including I/O components 120, some of which may be built in. Examples of I/O components 120 include, for example but without limitation, microphones, cameras, joysticks, gaming consoles, scanners, printers, wired speakers, wireless speakers (e.g., via BLUETOOTH®- or ZIGBEE®-branded connections), or the like.

In some examples, ports 118 include USB ports for logically connecting the computing device 100 to external devices via a USB connection. As described in more detail below, some examples connect the computing device 100 to intelligent monitors via USB connections, and synchronize playback (through the USB connections) of audio across speakers of separate intelligent monitors in a manner that creates a more immersive audio experience for a user. For example, as detailed in several examples below, the computing device 100 may be connected to four intelligent monitors and may synchronize playback of audio to come through all of the speakers of the monitors, through just a select pair of speakers on one audio, or through groupings of speakers on two or more monitors (e.g., one monitor's speakers are designated as the "right" channel, another monitor's speakers are designated as the "center" channel, and still another monitor's speakers are designated as the "left" channel). Additional details on such examples are provide below.

Additionally, the I/O ports 118 may include one or more ports for communicating data over wired connections (e.g., Ethernet, RJ11, or the like) as well as ports for audio or visual connections (e.g., High-Definition Multimedia Interface (HDMI), optical, or the like). In some examples, the I/O ports 118 include USB port connections for facilitating synchronization of audio played through the USB external devices 202a-d discussed below in reference to FIG. 2.

In some examples, the network component 124 includes a network interface card and/or computer-executable instructions (e.g., a driver) for operating the network interface card. Communication between the computing device 100 and other devices may occur using any protocol or mechanism over any wired or wireless connection. In some examples, the network component 124 is operable to communicate data over public, private, or hybrid (public and private) using a transfer protocol, between devices wirelessly using short range communication technologies (e.g., near-field communication (NFC), BLUETOOTH®-branded communications, or the like), or a combination thereof.

Additionally or alternatively, the network component 124 may include an antenna to enable radio frequency (RF) or other wireless communications to transfer data in according with a host of wireless standards. For example, the network component 124 may enable the computing device 100 to wirelessly communicate data using the IEEE 802.11 standard, over a wireless fidelity (Wi-Fi) network; using the IEEE 802.16 standard, over a Worldwide Interoperability for Microwave Access (WiMAX) network; or the like.

Computing device 100 is but one example of a suitable computing environment and is not intended to suggest any limitation as to the scope of use or functionality of the invention. Neither should the computing device 100 be interpreted as having any dependency or requirement relating to any one or combination of components/modules illustrated.

Figure 2:
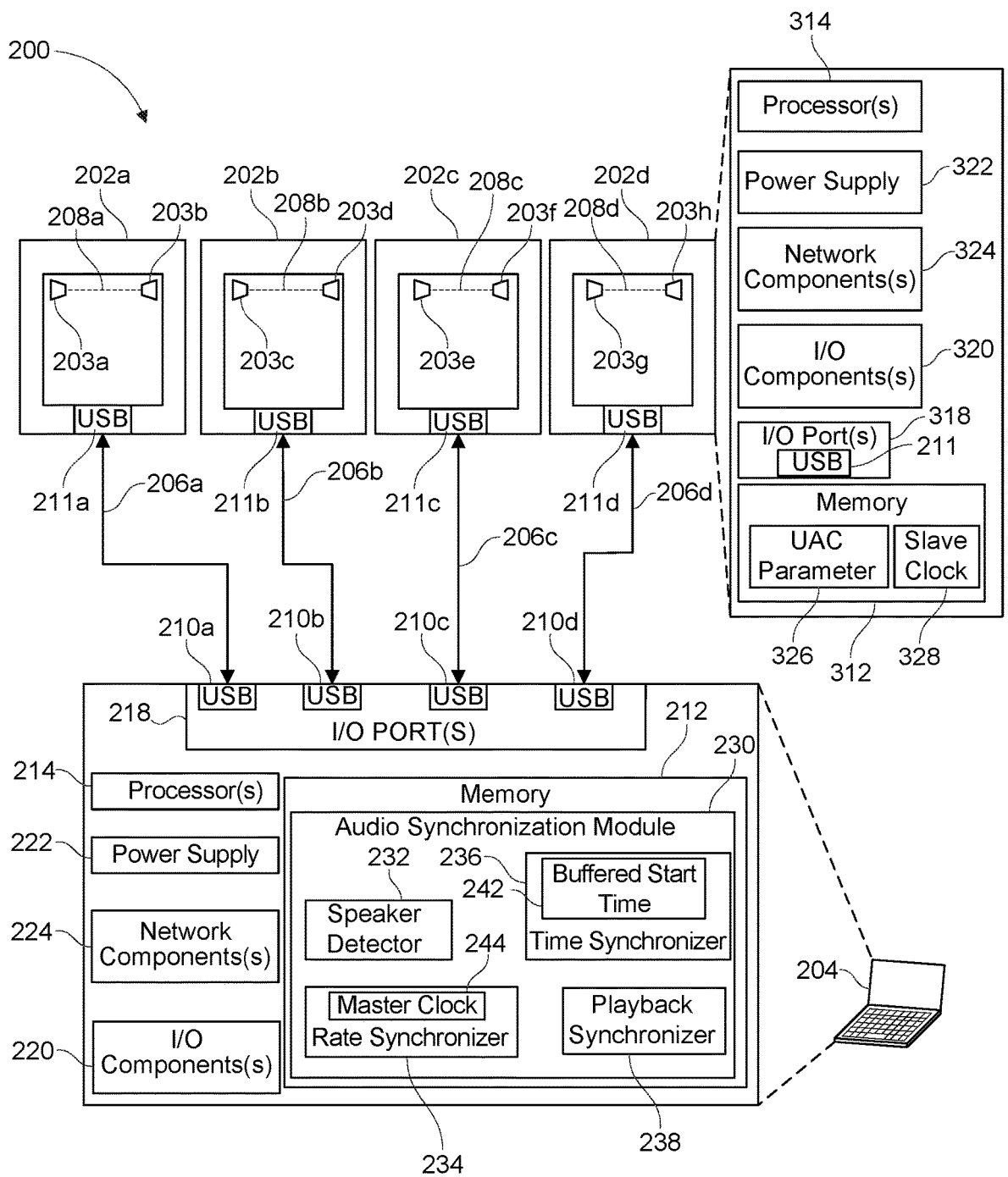
FIG. 2 illustrates a block diagram of a speaker synchronization architecture for synchronizing speakers over USB connections.

FIG. 2 illustrates a block diagram of a speaker synchronization architecture 200 for synchronizing speakers over USB connections. Speaker synchronization architecture 200 involves a USB host device 204 that is connected to one or more external USB external devices 202a-d through respective USB wired connections 206a-d. The USB host device 204 may take the form any of the previously discussed computing devices 100 in reference to FIG. 1. For example, the USB host device may be a laptop computer, PC, mobile table, hybrid of a tablet and laptop (e.g., a MICROSOFT SURFACE®-branded device), server, other such computer capable of performing the synchronization of speakers discussed herein. In particular, USB host device 204 includes at least memory 212, processor(s) 214, I/O port(s) 218, I/O component(s) 220, power supply 222, and network component 224, which may include any of these similar components described above in reference to FIG. 1. In particular, I/O port(s) 218 may include one or more USB port connections for connection to the USB external devices 202a-d.

Memory 212 stores an audio synchronization module 230 comprising a speaker detector 232, a rate synchronizer 234, a time synchronizer 236, and a playback synchronizer 238, all of which represent programmed instructions, code, and/or firmware executable by the processor(s) 214 for detecting the USB external devices 202 and their resident speakers 203 and synchronizing (across the USB connections 206) playback of an audio stream through all (or some) of the detected speakers 203. Further still, the rate synchronizer 234 includes a master audio clock ("master clock") 244, and the time synchronizer 236 includes a calculated buffered start time 236. The master clock 244 represents the current frame/microframe calculated based on SOF tokens. Both of which are generated to control rate synchronization of the speakers 203 selected for playing an audio stream. Operations of the audio synchronization module 230, and its constituent components, are discussed in more detail below.

The USB external devices 204a-d may take the form of any peripheral or computing device with speakers 202a-h that may be managed over a USB connection. Any or all of the USB external device 204 may include memory 312, processor(s) 314, I/O port(s) 318, I/O component(s) 320, power supply 322, and network component 324, which may include any of these similar components described above in reference to FIG. 1. Additionally, any or all of the USB external devices 202a-d may include a camera 326 that enables users to interact with multimedia applications (e.g., video chat, gaming, augmented or virtual reality, or the like). The USB external devices 204a-d may be one or more intelligent monitors, computing devices, multimedia hubs, multimedia projectors, stereo receivers, standalone wireless speakers, tablets, televisions, or any other electronic devices with speakers (or combinations thereof) that are controllable using a USB connection. In some particular examples, the USB external devices 204a-d are intelligent monitors (e.g., the SURFACE HUB™ manufactured by the MICROSOFT CORPORATION®) are used as the USB external devices 204a-d, presenting multiple interactive display screens in a "tiled array display." For purposes of this disclosure, a tiled array display refers to separate USB external devices 202a-d that are controlled to present audio and video content in an extended, combined, or cohesive manner. For example, different parts of applications, or different applications themselves, that work together (e.g., video chat and whiteboarding) may be presented on separate intelligent monitors. Video may be extended across multiple intelligent monitors. Video chat may show one person's camera on one intelligent monitor and another person's camera on another intelligent monitor. Gaming applications may show a field view of a game on one intelligent board and a virtual reality view on another intelligent monitor. The possibilities are practically endless as to the number of different applications that can be presented on the USB external devices 202a-d in a collaborative manner—for instance, extended across multiple displays or as different application windows that interact together.

Moreover, the speaker synchronization architecture depicts four separate USB external devices 202. This is only an example. Any number of USB external devices 202 may be used (e.g., 1, 5, 10, 20, etc.) up to the limitations of the relevant USB standards (e.g., 256 for USB 2.0).

In some examples, each of the USB external devices 202a-d includes a pair of speakers 203a-h that may be synchronized and controlled by the USB host device 204 through the respective USB connections 206a-d. This disclosure references the speakers 203a-h individually and also as pairs of speakers. To aid the reader, pairs of the depicted speakers 203a-h are logically shown as speaker pairs 208a-d in FIG. 2. For example, speaker pair 208a includes speakers 203a and 203b, speaker pair 208b includes speakers 203c and 203d, speaker pair 208c includes speakers 203e and 203f, and speaker pair 208d includes speakers 203g and 203h.

The USB wired connections 206a-d connect USB ports 210a-d of the USB host device 204 and USB ports 211a-d of the USB external devices 202a-d, respectively. Though not shown, alternative embodiments use only one USB connection 206 between a single USB port 210 of the USB host device and a USB hub (not shown), and the rest of the USB external devices 202b-d connect to this USB hub each via their respective USB cables 206a-d.

The expanded window relative to USB external device 202d illustrates one example of select internal components that may be found on each of the USB external devices 202a-d. In some examples, each of the USB external devices 202a-d includes at least memory 312, processor(s) 314, I/O port(s) 318, I/O component(s) 320, power supply 322, and network component 324, which may include any of these similar components described above in reference to FIG. 1. In some specific examples, the I/O components 320 include cameras and microphones to facilitate interactive applications, such as video chatting, gaming, augmented reality, and the like.

The USB external devices 202 may store a host of USB Audio Class parameters 326 in memory 312—depicted as "UAC parameters 326" in FIG. 2. Examples of USB Audio Class parameters that may be stored include, without limitation: synchronization mode (e.g., synchronous, asynchronous, and adaptive), device identifier, device manufacturer, number of speakers, number of audio channels, bandwidth descriptors, and the like. Additionally or alternatively, the USB external devices 202a-d generate and synchronize their own slave clock 328 to the master clock 244, as indicated by SOF tokens that are shared by the USB host device 204. As discussed in more detail below, the slave clocks 328 on the various USB external devices 202 are slaved to the incoming USB frame or microframe of the master clock 244 in the USB host device 204, thereby allowing the USB external devices 202a-d to operate in the "synchronous" USB Audio Class mode of operation.

In operation, the USB host device 204 synchronizes playback of audio across different speaker pairs 208 of separate USB external devices 202. For example, the USB host device 204 may be configured speakers 203a,b of USB external device 202a to play audio at the same time or in synchronization with speakers 203g,h of USB external device 202d. In another example, all of the speakers 202a-h may be configured by the USB host device 204 to synchronously play audio. Alternatively, the USB host device 204 may configure speakers 203 across different USB external devices 202 to function as different audio channels for audio, e.g., left, center, and right channels. In this vein, the USB host device 204 may configure speakers 203a,b,c to play audio meant for a left channel, configure speakers 203d,e to synchronously play audio meant for a center channel, and configure speakers 203f,g,h to play audio meant for right channel. In such a configuration, not only does USB host device 204 configure the speakers 202a-h to play audio synchronously, but USB host device 204 also splits speakers 202 in speaker pairs 208 to function as different audio channels.

The audio synchronization module 230 synchronizes playback of audio through speakers 203a-h in a manner that the audio stream both starts at the same time ("time synchronization") on each speaker 203a-h and plays at the same rate ("rate synchronization"). The audio synchronization module 230 may use: a) USB synchronous mode (e.g., defined in the USB 2.0 specification § 5.12.4 Isochronous Devices and § 3.11.2 Synchronous in the USB Audio Specification 2.0); b) the scheduling of data on defined timeframe (or "microframe") numbers rather than as soon as possible; and/or c) shared timeframe/microframe counters amongst all of the USB endpoints to be synchronized. In operation, the audio synchronization module 230 only synchronizes USB external devices 202 that are in synchronous mode, as defined by the USB standard. In some examples, the audio synchronization module 230 includes the speaker detector 232, the rate synchronizer 234, the time synchronizer 236, and the playback synchronizer 238. These constituent parts of the audio synchronization module 230 are discussed next.

The speaker detector 232 detects the USB external devices 202a-d over the USB connections 206a-d, respectively, to identify which speakers are available for synchronous playback of a given audio stream. Once a USB external device 202 is connected to the USB host device 204 via a USB connection 206, the speaker detector 232 detects the various UAC parameters 326 (e.g. synchronization mode, such as synchronous, asynchronous, or adaptive modes; device identifier; device manufacturer; number of speakers; number of audio channels; bandwidth descriptors; or the like). In some examples, the speaker detector 232 is configured to exclude USB external devices 202 from synchronized audio playback based on the detected UAC parameters 312. As previously mentioned, USB external devices 202 that do not operate in USB synchronous mode are excluded from being synchronized, and used, to play a selected audio stream. Put another way, the speaker detector 232 excludes those USB external devices 202 that are designated to operate in asynchronous or adaptive modes.

The speaker detector 232 identifies the number of speakers 203 on each synchronous-mode USB external device 202, as well any channel information related to those speakers 203. These speakers 203 on the USB external devices 202 operating in synchronous mode are selected for use in playing an audio stream For clarity, the "available speakers" 203 refer to speakers 203 on the USB external devices 202 that are both identified through a USB connection 206 and determined to operate in USB synchronous mode.

Figure 3:
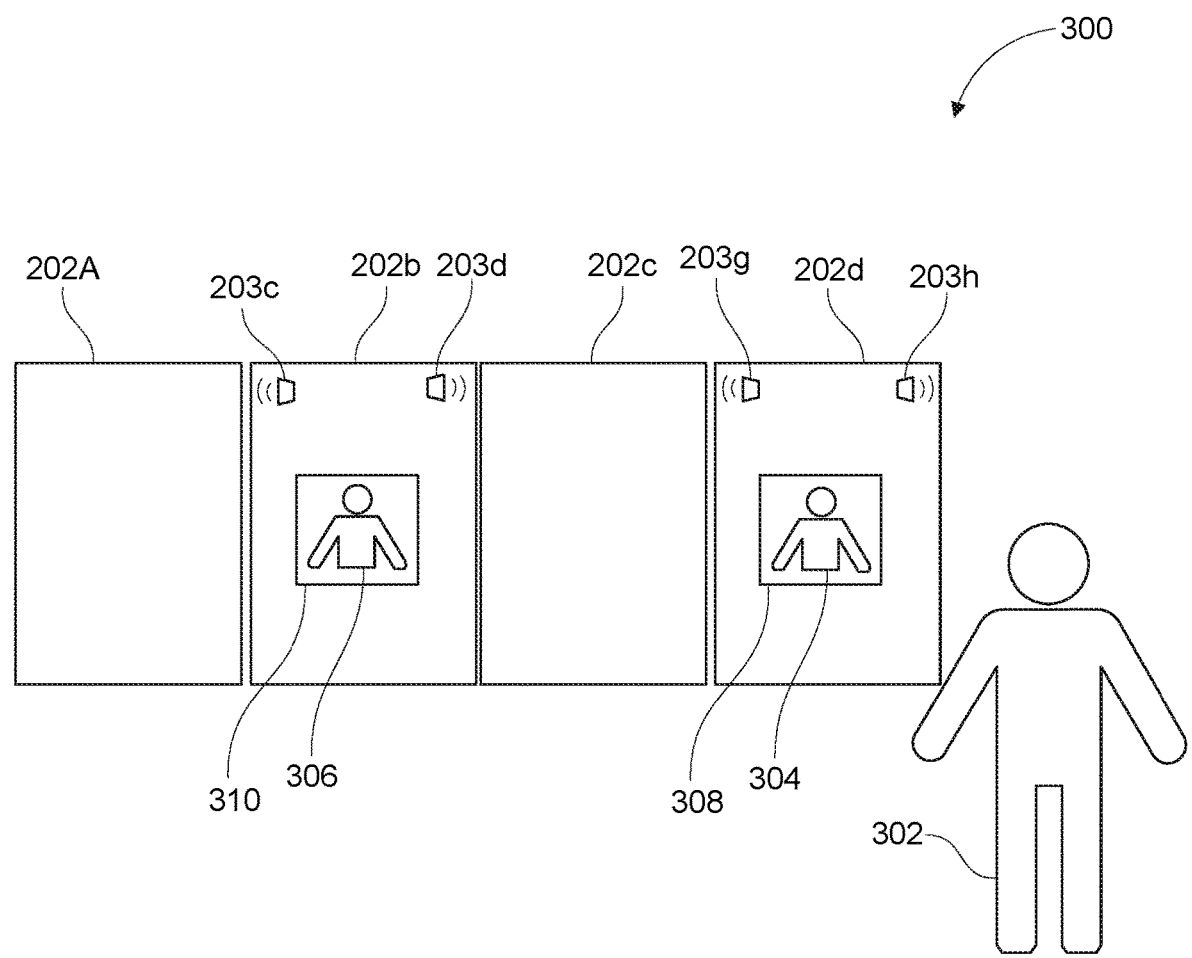
FIG. 3 illustrates a graphical view of a particular use case where intelligent monitors are displayed in a tile array and speakers on multiple intelligent monitors are synchronized to facilitate a video chat.
Figure 4:
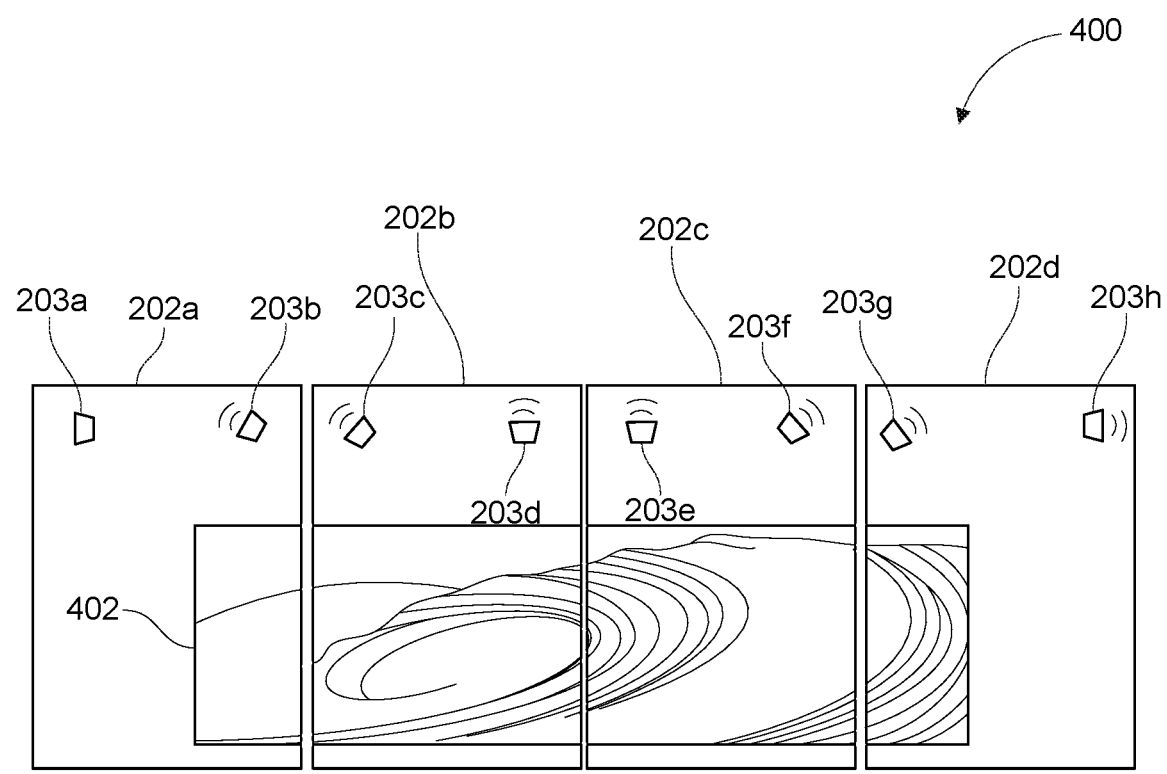
FIG. 4 illustrates a graphical view of a particular use case where intelligent monitors are displayed in a tile array and speakers on multiple intelligent monitors are synchronized to intelligently provide audio for a video extended across the tile array.

Once the available speakers 203 in synchronous mode are detected, the USB host device 204 selects, either by its operating system or an application, which available speakers to use in audio playback. Speaker selection from the available speakers 203 may be application-specific or based on user-preferences. FIGS. 3 and 4 below provide two different use cases where different available speakers 203 are synchronized based on the type of application being played. For clarity, the available speakers 203 selected for an audio stream by the operating system or application of the USB host device 204 are referred to herein as the "selected available speakers" 203.

Additionally, the operating system or application of the USB host device may provide mixing information for the available speakers 203. The number of selected speakers 203 may collectively define a number of audio channels for an audio stream, and those channels may be mixed for optimal sound. For example, the operating system or application may dictate that all eight speakers 203a-h are to be used, the eight speakers may be set to adjust audio sent speakers 203a,b to receive left-channel sound, speakers 203c,d,e,f to receive center-channel sound, and speakers 203g,h to receive right-channel sound. In such examples, the USB host device defines a number of audio channels for a given audio stream based on the operating system or application playing the audio stream. The assigned number of audio channels are then mapped, or correlated, to the identified speakers in the USB external devices.

Audio mixing may then be applied to the identified speakers in the USB external devices based on the assigned audio channels, and the audio stream data sent to the different USB external devices 202 may be mixed for the specific speakers in the USB external devices. The mixing algorithms used to balance such sound is beyond the scope of this disclosure, other than to say that, in some examples, the selected speakers 203 may be assigned to different audio channels by an operating system or application on the USB host device 204.

The rate synchronizer 234 and the time synchronizer 242 perform rate synchronization and time synchronization, respectively, of the selected available speakers 203. To implement rate synchronization, the USB external devices 202a-d slave their respective slave clocks 328 to the USB "start of frame" (SOF) token of the master clock 244, thereby configuring the USB external devices 202a-d to operate in synchronous mode. For example, a USB external device 202 may lock its slave clock 328 to a 1 ms or 1 ns SOF tick that occurs at the beginning of every microframe of the master clock 244. In some examples, the rate synchronizer 234 of the USB host device 204 reads incoming USB data to determine Start-of-Frame tokens and uses these SOF tokens to reconstruct an audio clock at the correct rate to match the USB SOF rate. In some examples a phase-locked-loop (PLL) is used, though the exact implementation is out of scope of this disclosure. Thus, the USB external device 202 may lock to the SOF token of the USB host device 204 at different frequencies (e.g., 1 kHz for USB low-speed/full-speed, 8 kHz for USB high-speed/super-speed) and then use a clock multiplier or phase-locked loop (PLL) to reach an audio sample rate (typically 48 kHz frame clock plus a 3-12 MHz bit clock). USB synchronous mode requires devices to slave to the USB SOF.

Frame rate or microframe rate is fully determined by the base USB standard data rate. For example, 1 kHz is used for USB low-speed (LS)/full-speed (FS) and 8 kHz is used for USB high-speed (HS)/super-speed (SS). One skilled in the art will understand and appreciate that USB standards are backwards-compatible, e.g., USB 2.0 may run at LS, FS, or HS while USB 3.0 can run at LS, FS, HS, SS.

The time synchronizer 242 performs several functions to set an appropriate start time for the USB host device to begin sending data of an audio stream to the USB external devices 202. The USB external devices 202, having slaved their respective audio clocks 328 to the master clock 244, are ready to begin playing the audio stream at the same clock rate. But different USB external devices 204 may begin playing received data with varying degrees of processing latency, especially if the USB external devices 202 are completely different devices or manufactured by different companies. So the USB host device 204 identifies a current USB host frame/microframe of the master clock 244 and then adds a frame/microframe time buffer to generate a buffered start time 242. In some examples, the USB host device 204 shares frame/microframe counter values with the USB external devices 202a-d. The USB host device 204 uses the frame/microframe counter to determine the buffered start time.

In some examples, the buffered start time indicates a particular frame or microframe (depending on the USB standard) for starting transmission of the audio stream to the USB external devices 202. The time buffer may be preset, either manually or based on the device identifier, manufacturer, operating software, or the like of the USB external device 202. Alternatively, the time buffer may be determined through machine learning or performed on analyzing samples of actual audio output from different USB external devices 202. However set, the time buffer sets a specific frame/microframe buffer period to for the USB host device 204 to wait from the current frame/microframe before sending data for the audio stream.

The playback synchronizer 238 sends an instruction for playing an audio stream ("Start Playback") and data of the audio stream to the USB external devices 202 at the buffered start time (frames/microframes) for playback out of the selected available speakers 203. The USB external devices 202 then play the audio stream upon receipt of the associated data sent over the USB connections 206 by the USB host device 204. Playback of the audio stream is synchronized across selected available speakers 203a-h of the USB external devices 202a-d.

Different USB external devices 202 may have different processing latencies between an begin playback signals ("Start Playback") being sent from the USB host device 204 and actual playback of a given audio stream through speakers 203 of a USB external device 202. This processing latency in conventional speakers desynchronizes the audio playback across disparate USB external devices 202. To account for such processing latency, examples may use USB external devices 202a-d that are all manufactured by the same manufacturer, and therefore experience—or are programmed with—the same deterministic latency. Alternatively, the USB external devices 202a-d may be manufactured by different manufacturers but their deterministic latencies are known, and the buffered start time 236 is set to account for longest processing latency of the USB external device 202.

Thus, the previously discussed examples provide rate synchronization, time synchronization, and a matching playback latency across USB external devices 202. Together, all three provide an architecture to effectively synchronize audio playback through disparate end devices.

FIG. 3 illustrates a graphical view of a particular use case 300 where intelligent monitors are displayed in a tile array and speakers on multiple intelligent monitors are synchronized to facilitate a video chat. The depicted four illustrated intelligent monitors represent the USB external devices 202a-d that are connected via USB to the USB host device 204 (not shown). These intelligent monitors may be wall-mounted or otherwise hung so as to show specific video feeds of the video chat.

A user 302 is video chatting with two remote users 304 and 306. Video of remote user 304 is presented in user interface (UI) 308 on the intelligent monitor of USB external device 202b, and video of remote user 306 is presented in UI 310. The accompanying audio for the video chat uses projects audio for the remote users 304 and 306 from their respectively displayed USB external devices 202d and 202b. In particular, audio for user 304 is projected out of speakers 203g and 203h of the USB external device 202d, and audio for the user 306 is projected out of speakers 203c and 203d of the USB external device 202b.

To ensure the audio experience is optimal, the USB external devices 202b and 202d are synchronized by the USB host device 204 using the various techniques discussed herein. Projecting the audio for the users 304 and 306 from the speakers 203 of the respective intelligent monitors on which they appear improves the video chatting experience by localizing the audio from the direction that the users 304 and 306 are shown to user 302. If the audio of user 304 and 306 is not synchronized between USB external devices 202d and 202b, the user 302 will not audibly be able to associate the speech of the other users 304,306 with their respective videos, providing a suboptimal video chatting experience.

FIG. 4 illustrates a graphical view of a particular use case 300 where intelligent monitors are displayed in a tile array and speakers on multiple intelligent monitors are synchronized to intelligently provide audio for a video extended across the tile array. The same four intelligent monitors, or USB external devices 202a-d, shown in FIG. 3 are now being used to present the video 402 across in an extended manner, meaning the video extends across all of the intelligent monitors. The speakers 203a-h have been synchronized and assigned to different audio channels for the accompanying audio stream related to the video 402. Speaker 203a has been assigned by the USB host device 204 to be the leftmost channel. Speakers 203b and 203c are assigned as left channels but with less left-direction audio as speaker 203a. Speakers 203d and 203e are assigned as center channels. Speakers 203f and 203g are assigned as right-leaning channels but with less right-directional audio as speaker 203h. Finally, speaker 203h has been assigned by the USB host device 204 to be the rightmost channel.

Figure 5:
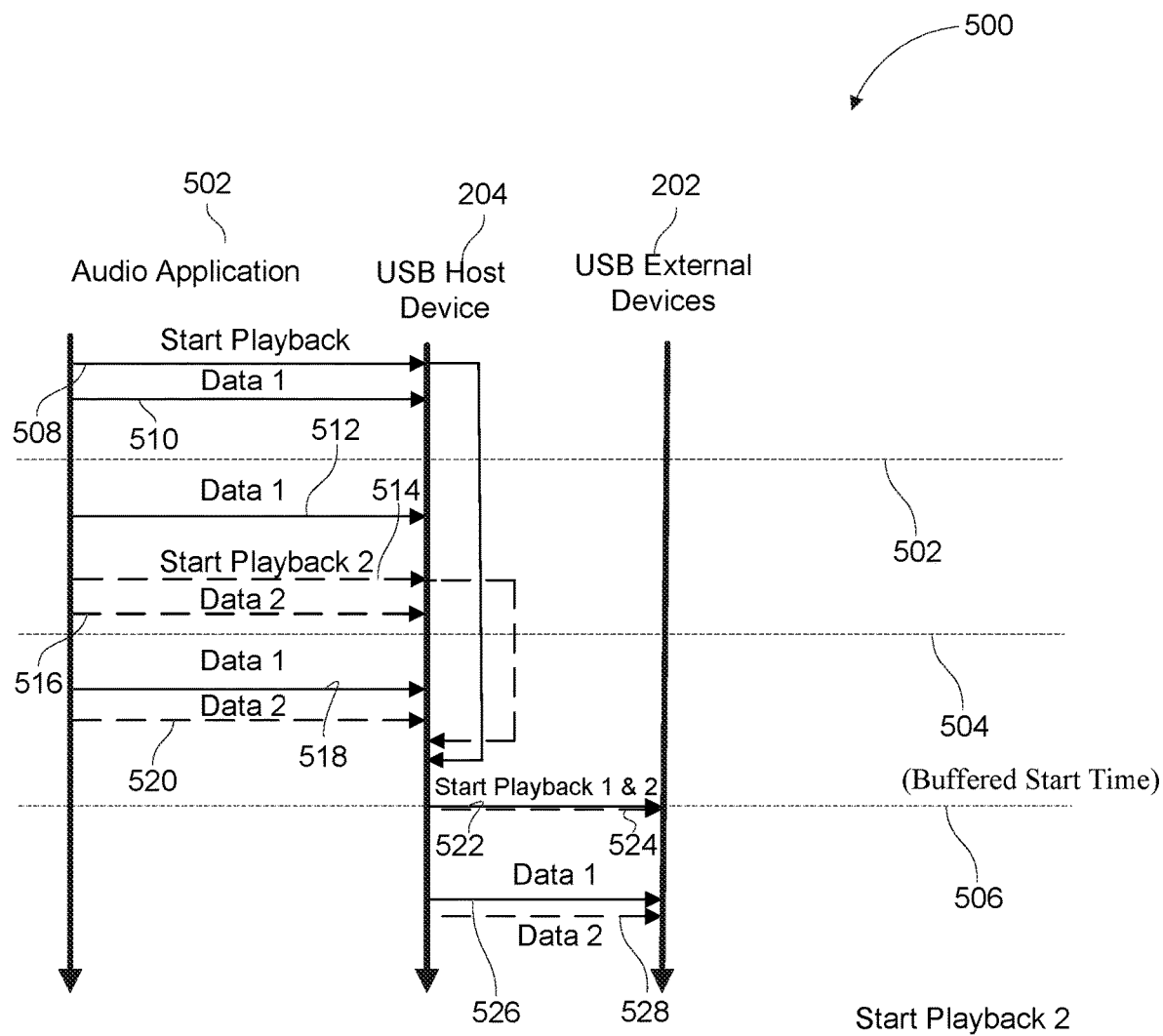
FIG. 5 is a timeline diagram illustrating a timeline for synchronizing speakers on external end devices over a USB connection.

FIG. 5 is a timeline diagram illustrating a timeline 500 for synchronizing speakers on external end devices over a USB connection. Timeline 500 shows three separate USB microframe intervals 502, 504, and 506, progressing from top to bottom. The intervals 502, 504, and 506 represent USB microframes that correspond to the master clock discussed above that is generated by the USB host device 204 according to the USB standard used to communicate between the USB host device 204 and the USB external devices 202, with interval 506 being designated by the UBS host device 204 to be the buffered start time. For example, interval 502 may be USB microframe 1000, interval 504 may be USB microframe 1001, and interval 506 may be USB microframe 1002. Timeline 500 also shows the timing (in microframes) for when data transfers of an audio stream and playback initiation instructions (shown as "Start Playback") are sent between the audio synchronization module 230, the USB host device 204, and the USB external devices 202.

Timeline 500 also shows the initiation and transmission of start signals and an audio stream's data between an audio application 502 that is requesting playback of the audio stream, the USB host device 204, and USB external device 202. The start signals for playing the audio are shown as "Start Playback" 1 and 2, and the data for the audio stream is shown as "Data" 1 and 2. The audio application 502 may be any application that plays audio (e.g., video services, websites, video chat, whiteboarding, gaming, or the like).

Conventional USB synchronous mode schedules audio data such that audio playback begins immediately on the first available microframe after data for the audio stream is sent to a USB controller of a USB host device 202. When multiple separate external USB devices (USB external devices 202) are used to play audio, it is very difficult to synchronously send the start signals at the same time so that the external USB devices receive such start signals in the same microframe, for playback on the next microframe. Instead of sending the start signals immediately out to the USB external devices 202 that are being used to for playing audio, the disclosed examples wait for a buffer period (in microframes) to essentially capture all the start signals needed to be sent to the separate USB external devices 202 and the data signals for the audio stream. This is shown in timeline 500 through the following sequence.

In microframe 502, a first start signal (Start Playback 1) for a first USB external device 202a is initiated by the audio application 502 and received by the USB host device 204, during microframe 502. First data for the audio stream (Data 1) is also received during this microframe 502. These two signals are shown at 508 and 510. Start Playback 1 traditionally would trigger the USB host device 204 to send Data 1 to the first USB external device 202a on the next available microframe (microframe 504). Instead, the USB host device 204 waits until a calculated buffer start time (microframe 506) before sending any data for the audio stream. In the interim, the audio application 502 sends a second start signal (Start Playback 2) and data for the audio stream (Data 2) for a different USB external device 202b. This is shown at 514 and 516. Additionally, the audio stream data (Data 1) for the first USB external device 202a data is sent during this microframe 504, as shown at 512. Again, the USB host device 204 waits to transmit the received audio stream data until the buffered start time. In the next microframe, the USB host device 204 receives Data 1 and Data 2 meant for the USB external devices 202a and 202b, respectively, as shown at 518 and 520. At the buffered start time (interval 506), the USB host device 204 transmits signals to initiate playback (Start Playback 1 and 2) and data signals (Data 1 and Data 2) to the USB external devices 202a and 202b, respectively, as shown at 522, 524, 526, and 528. In turn, the USB external devices 202a and 202b begin to play the received data (Data 1 and Data 2, respectively) synchronously, at a future time determined by their internal latency. The exact amount of USB device latency between receipt of "Start Playback" and actual audio being emitted doesn't matter, as long as all USB external devices have the same amount of latency. And, as previously discussed, the fact that these USB external devices 202a and 202b have slaved their audio clocks (328) to the master audio clock (244) of the USB host device 204 ensures that the streams, which started simultaneously per above, will continue to be synchronized as playback continues.

Thus, unlike conventional audio drivers, the USB host device 204 will wait when a start signal request comes in for one of the endpoints. Instead of the data being scheduled to transmit on the first available microframe, the data will be buffered for a specific future microframe. This gives enough time such that all data that has come in will be transmitted across the USB connections 206 at the same microframe to the USB external devices 202 that all have clocks slaved to the master clock (244) of the USB host device 204.

Figure 6:
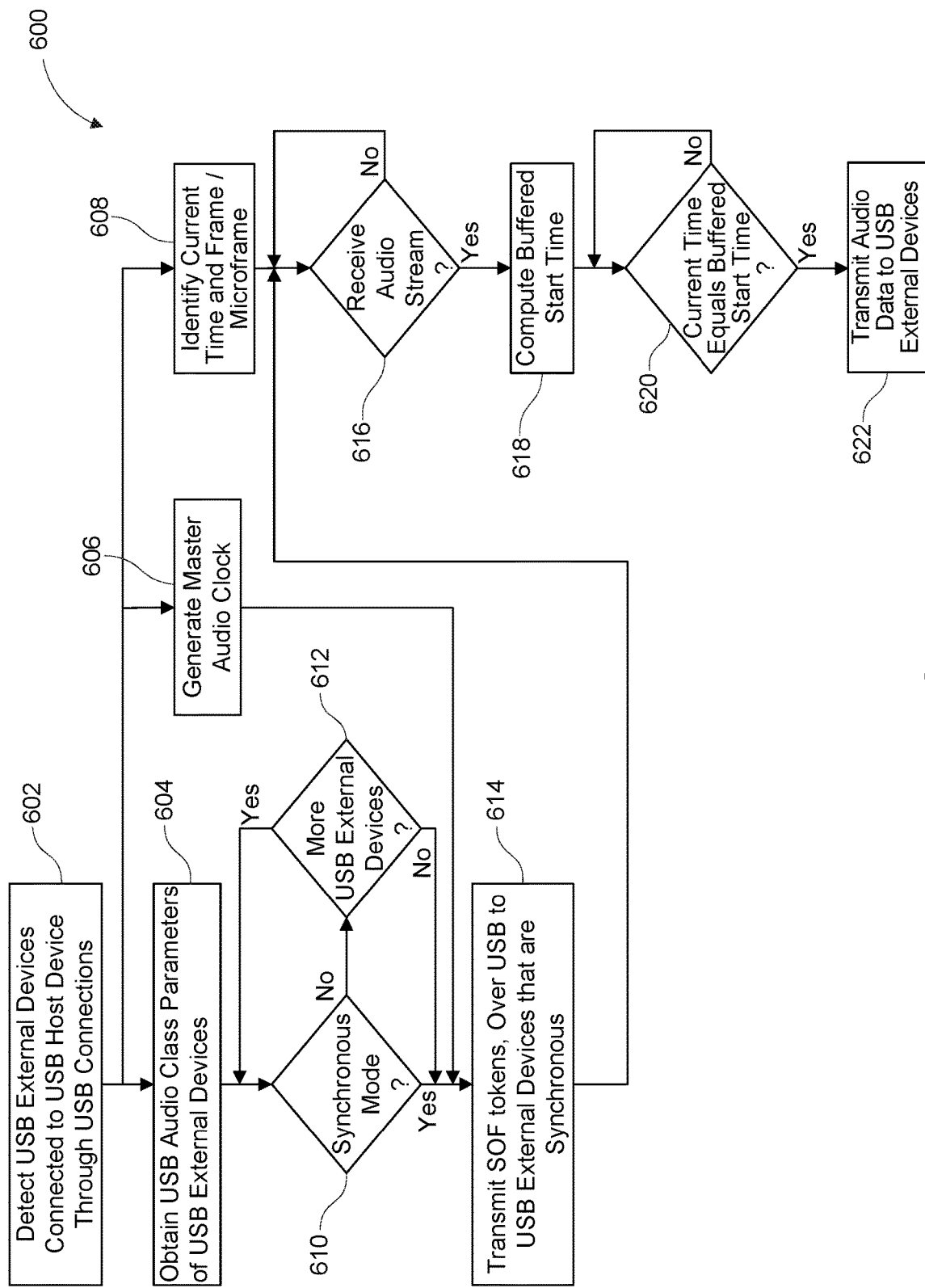
FIG. 6 illustrates a flow chart diagram depicting a work flow for synchronizing playback of audio across disparate USB external devices.

FIG. 6 illustrates a flow chart diagram depicting a work flow 600 for synchronizing playback of audio across disparate USB external devices. Initially, a USB host device 204 detects one or more USB external devices connected through USB connections, as shown at 602. USB Audio Class parameters, including the USB synchronization mode are obtained from the USB external devices, as shown at 604. This specifically includes the USB synchronization mode (synchronous, asynchronous, or adaptive) of the USB external devices as well as the number of speakers, device manufacturer, number of speakers, number of audio channels, or the like. USB external devices operating in anything but synchronous mode are ignored, as indicated by decision block 610. The USB host device continues to check all of the connected USB external devices to determine which ones operate in synchronous mode, as shown at decisions block 612 and 610. Those that are in synchronous mode are kept for synchronization, and the speakers on each so-kept USB external device are identified by the USB host device through the received USB Audio Class parameters. Additionally, the USB host device 204 may include a driver with a configuration block that excludes all USB external devices 202 except ones that are predetermined for being used (e.g., everything except devices with a specific USB manufacturer, vendor, or product identifier).

The USB host device 204 synchronizes the USB external devices 202 using SOF tokens. In some examples, this is done through transmitting SOF tokens from the USB host device 204, over the USB connections, to the USB external devices 202, as shown at 614. As previously discussed, the USB external devices 202a-d slave their respective slave clocks 328 to the USB SOF token of the master clock 244, thereby configuring the USB external devices 202a-d to operate in synchronous mode. Once the USB external devices 202 each wait for receipt of enough SOF tokens from the USB host device 204 to set up and slave their audio clocks to the SOF rate.

Further still, the USB host tracks (or identifies) the current time and frame or microframe. At decision block 616, the USB host device waits for an audio stream from an audio application to play on the USB-connected synchronous-mode operating USB external devices. When an audio stream is received (and the Yes path of decision block 616 is taken), a buffered start time for the audio stream is determined, as shown at 618. In some examples, the buffered start time represents the current timeframe (e.g., frame/microframe in USB parlance) of the USB bus plus an additional buffer time (e.g., added frame(s)/microframe(s)).

As shown at decision block 620, the USB host device waits for the current time (or frame/microframe) to equal the buffered start time (or buffered start frame/microframe). When the two match, audio data of the audio stream is transmitted at the buffered start time, through the USB connections, to enable the USB external devices to synchronize playback of the audio stream through the speakers. This is shown at 622.

Figure 7:
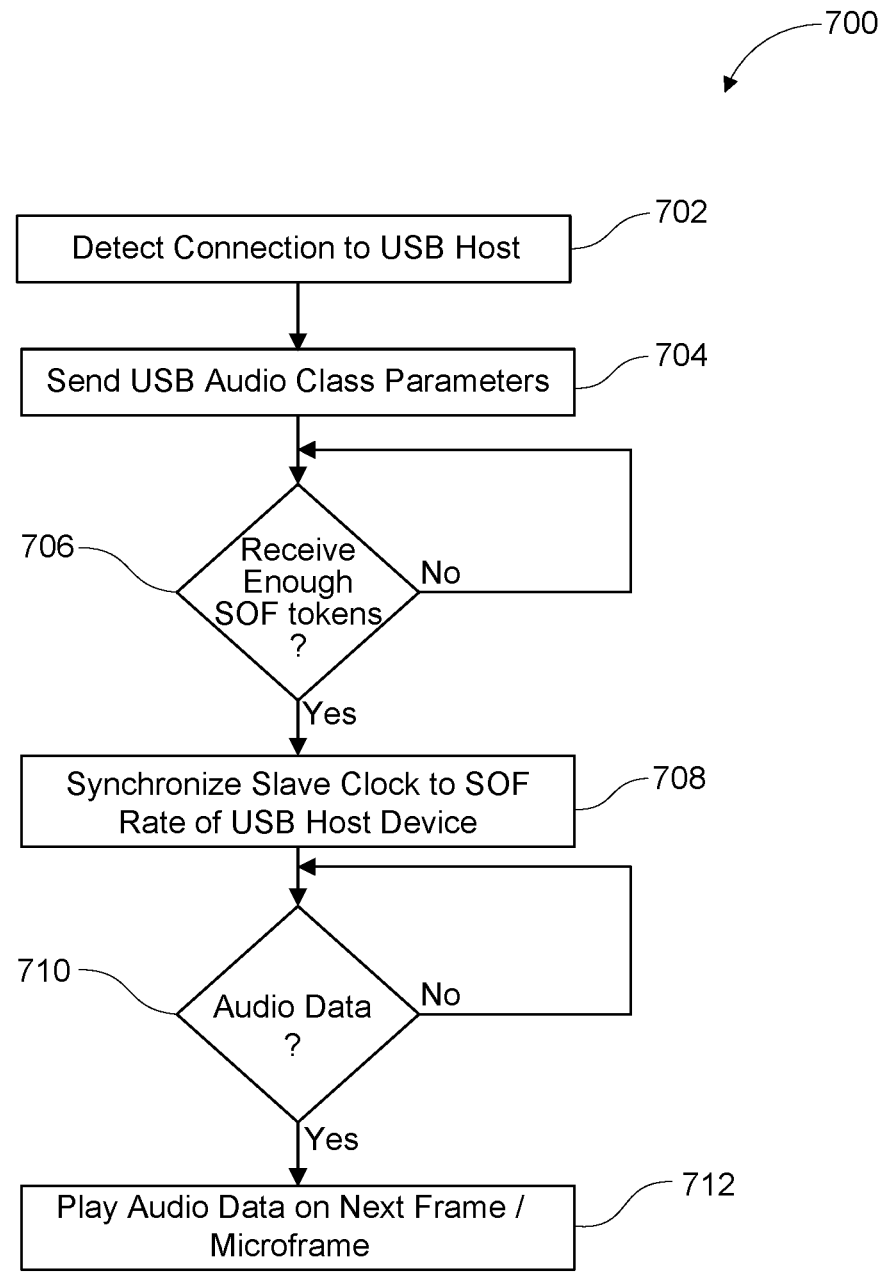
FIG. 7 illustrates a flow chart diagram depicting a work flow for synchronizing playback of audio across disparate USB external devices.

FIG. 7 illustrates a flow chart diagram depicting a work flow 700 for synchronizing playback of audio across disparate USB external devices. A USB external device detects a USB connection to a USB host device, as shown at 702. Consequently, or upon request, the USB external device sends its respective USB Audio Class parameters to the USB host device over the USB connection, as shown at 704. The USB Audio Class include at least the synchronization mode of the USB external device (synchronous, asynchronous, or adaptive) as well as any other previously discussed parameter, e.g., number of speakers, number of audio channels, device manufacturer, number of speakers, number of audio channels, or the like.

As depicted at decision block 706, the USB external device waits to receive enough SOF tokens to set up and slave an audio clock of the USB external device to the SOF rate. Once enough SOF tokens are received (e.g., more than a predetermined number), the USB external device synchronizes its audio clock to the SOF rate, as shown at 708. Optionally, the USB external device may not correlate its audio clock to the actual SOF number, as SOF numbers are broadcast on each SOF, per the USB specification, but may not be relevant the synchronization discussed herein.

As depicted at decision block 710, the USB external device, with its audio clock slaved to the SOF tokens from the USB host device, waits to receive "Start Playback" instructions as well as audio data for an audio stream from the USB host device, which as mentioned above waits until a buffered time start to send both. Once audio data is received by the USB external device, the USB external device plays such received audio data. Thus, each USB external device plays the audio data on at a deterministic time.

ADDITIONAL EXAMPLES

Some examples are directed to synchronizing audio played through speakers of USB external devices that are individually connected to a computing device through port connections (e.g., USB connections). Memory associated with the computing device stores executable instructions for directing, over the port connections, synchronized playback of audio through the speakers of the USB external devices. One or more processors programmed to: detect the USB external devices over the port connections; SOF tokens to the USB external devices to enable the USB external devices to synchronize audio playback; determine a buffered start time, relative to a SOF tokens for starting playback of the audio stream, the buffered start time comprising a current frame or microframe plus an additional time buffer; and transmit, through the port connections, a start playback request as well as audio data of the audio stream at the buffered start time to enable the USB external devices to synchronize playback of the audio stream through the speakers.

In some examples, the one or more processors are further programmed to determine SOF tokens based on a USB protocol being used by the USB host device.

In some examples, the one or more processors are further programmed to configure slave clocks of the USB external devices on at least one member of a group comprising: 1 kHz SOF tokens for USB low-speed and/or full-speed; or 8 kHz for USB high-speed and/or super-speed.

In some examples, the USB external devices operate in synchronous mode.

In some examples, the buffered start time comprises a particular USB frame corresponding to the SOF tokens.

In some examples, the one or more processors are further programmed to: define a number of audio channels for the audio stream, assign the number of audio channels to the identified speakers in the USB external devices, assign audio mixing to the identified speakers in the USB external devices based on the assigned number of audio channels, and transmit audio data corresponding to the assigned audio mixing to the identified speakers in the USB external devices based on the assigned number of audio channels.

In some examples, the USB external devices comprise one or more intelligent monitors, computing devices, multimedia hubs, multimedia projectors, stereo receivers, stand-alone wireless speakers, tablets, or televisions.

In some examples, the USB external devices comprise two or more intelligent monitors arranged in a tiled array, wherein a first set of speakers on a first intelligent monitor plays first audio related to a first user in a video chat and a second set of speakers on a second intelligent monitor plays second audio related to a second user in the video chat.

In some examples, the USB external devices comprise two or more intelligent monitors arranged in a tiled array, and the audio data of the audio stream is transmitted at the buffered start time to the two or more intelligent monitors for synchronous playback through the identified speakers in the two or more intelligent monitors.

In some examples, the USB external devices are configured to play the audio stream at a deterministic time following the buffered start time.

Some example are directed to synchronizing audio played through speakers of universal serial bus (USB) external devices that are individually connected to a computing device through port connections (e.g., USB connections). To do so, the USB external devices are detected over the port connections. Speakers in the detected USB external devices are identified. SOF tokens are transmitted from the USB host device to the USB external devices to enable the USB external devices to synchronize audio playback. A buffered start time is determined relative to a SOF tokens for starting playback of the audio stream, the buffered start time comprising a current frame or microframe plus an additional time buffer. And a start playback request as well as audio data of the audio stream at the buffered start time are transmitted to enable the USB external devices to synchronize playback of the audio stream through the speakers transmitting, through the port connections.

In some examples, the USB external devices are configured to play the audio stream at a deterministic time following the buffered start time.

Some examples also defined a number of audio channels for the audio stream, assign the number of audio channels to the identified speakers in the USB external devices, assign audio mixing to the identified speakers in the USB external devices based on the assigned number of audio channels, and transmit audio data corresponding to the assigned audio mixing to the identified speakers in the USB external devices based on the assigned number of audio channels.

In some examples, the he USB external devices include two or more intelligent monitors.

In some examples, detection of the USB external devices over the port connections includes: retrieving USB Audio Class parameters from available USB external devices over the port connections; determining, from the retrieved USB Audio Class parameters, which of the available USB external devices are configured to operate in a synchronous USB synchronization mode; and selecting the available USB external devices that are configured to operate in the synchronous USB synchronization mode as the USB external devices.

Some examples additionally include: detecting connection of one of the USB external devices to the USB host device; transmitting USB Audio Class parameters from said one of the USB external devices to the USB host device; receiving the SOF tokens from the USB host device; determining a predetermined number of SOF tokens has been received by the USB external device; and incident to the predetermined number of SOF tokens being received, synchronize a slave clock to an SOF rate based corresponding to the SOF tokens received from the USB host device.

Some examples additionally include: receiving, at the USB external device, audio data from the USB host device over a port (e.g., USB) connection at the buffered start time; and playing the audio data through one or more speakers at a deterministic time relative to the current time indicated by the slave clock.

Other examples include computer storage media devices embodying computer-executable instructions for synchronizing audio played through speakers of USB external devices that are individually connected to a computing device through port connections (e.g., USB connections) through executing: a speaker detector executable by at least one processor to detect the USB external devices over the port connections and identify the speakers thereon for synchronously playing an audio stream; a rate synchronizer executable by the at least one processor to transmit SOF tokens to the USB external devices to enable the USB external devices to synchronize audio playback; a time synchronizer computing a buffered start time, relative to the SOF tokens, for starting playback of the audio stream, the buffered start time comprising a current time of the master audio clock plus an additional time buffer; and a playback synchronizer for transmitting, through the port connections, audio data of the audio stream at the buffered start time to enable the USB external devices to synchronize playback of the audio stream through the speakers.

While the aspects of the disclosure have been described in terms of various examples with their associated operations, a person skilled in the art would appreciate that a combination of operations from any number of different examples is also within scope of the aspects of the disclosure.

Although described in connection with an example computing device 100, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, VR devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media devices and communication media. Computer storage media devices include volatile and nonvolatile, removable and non-removable memory implemented in any method or technology for storage of information such as computer readable instructions, data structures, program modules, or the like. Computer storage media devices are tangible and mutually exclusive to communication media. Computer storage media devices are implemented in hardware and exclude carrier waves and propagated signals. Computer storage media devices for purposes of this disclosure are not signals per se. Example computer storage media devices include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

The examples illustrated and described herein, as well as examples not specifically described herein but within the scope of aspects of the disclosure, constitute exemplary means for synchronizing multiple external devices with speakers through port connections. For example, the elements described in FIG. 2, such as when encoded to perform the operations illustrated in FIGS. 6 and 7, constitute exemplary means for synchronizing multiple external devices with speakers through port connections.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for synchronizing audio played through speakers of universal serial bus (USB) external devices arranged in a tiled array that are individually connected to a computing device through port connections, the system comprising:
   memory associated with the computing device, said memory storing executable instructions for directing, over the port connections, synchronized playback of audio through the speakers of the USB external devices; and
   one or more processors programmed to:
      detect the USB external devices arranged in the tiled array over the port connections, wherein at least one of the USB external devices comprise a first speaker and a second speaker;
      identify the speakers in the detected USB external devices, the identified speakers comprising the first speaker and the second speaker;

transmit Start of Frame (SOF) tokens to the USB external devices to enable the USB external devices to synchronize audio playback;

determine a buffered start time, relative to the SOF tokens for starting playback of the audio stream, the buffered start time comprising a current frame or microframe plus an additional time buffer, wherein the additional time buffer being a preset time unique to at least one or more of the detected USB external devices;

assign audio mixing to the identified speakers in the USB external devices based on positions of the USB external devices in the tiled array, wherein the first speaker of the at least one USB external device is assigned a different audio mixing than the second speaker; and assign audio mixing to the identified speakers in the USB external devices based on positions of the USB external devices in the tiled array, wherein the first speaker of the at least one USB external device is assigned a different audio mixing than the second speaker; and transmit, through the port connections, a start playback request as well as audio data of the audio stream at the buffered start time to enable the USB external devices to synchronize playback of the audio stream through the speakers according to the audio mixing.

2. The system of claim 1, wherein the one or more processors are further programmed to determine SOF tokens based on a USB protocol being used by the USB external devices.

3. The system of claim 2, wherein the one or more processors are further programmed to configure slave clocks of the USB external devices on at least one member of a group comprising: 1 kHz SOF tokens for USB low-speed and/or full-speed; or 8 kHz for USB high-speed and/or super-speed.

4. The system of claim 1, wherein the wherein the additional time buffer being a preset time that is based on operating software detected on one or more of the USB external devices.

5. The system of claim 1, wherein the buffered start time comprises a particular USB frame corresponding to the SOF tokens.

6. The system of claim 1, wherein the preset time being based on a device identifier associated with one or more of the USB external devices.

7. The system of claim 1, wherein the USB external devices comprise one or more intelligent monitors, computing devices, multimedia hubs, multimedia projectors, stereo receivers, standalone wireless speakers, tablets, or televisions.

8. The system of claim 1, wherein the USB external devices comprise two or more intelligent monitors wherein a first set of speakers on a first intelligent monitor plays first audio related to a first user in a video chat and a second set of speakers on a second intelligent monitor plays second audio related to a second user in the video chat.

9. The system of claim 1, wherein the USB external devices comprise two or more intelligent monitors the audio data of the audio stream is transmitted at the buffered start time to the two or more intelligent monitors for synchronous playback through the identified speakers in the two or more intelligent monitors.

10. The system of claim 1, wherein at least one of the USB external devices is configured to play the audio stream at a deterministic time following the buffered start time.

11. The system of claim 1, wherein the additional time buffer is machined learned from data sets of other USB external devices.

12. A method for synchronizing audio played through speakers of universal serial bus (USB) external devices arranged in a tiled array that are individually connected to a computing device through port connections, comprising:

detecting the USB external devices arranged in the tiled array over the port connections, wherein at least one of the USB external devices comprise a first speaker and a second speaker;

identifying the speakers in the detected USB external devices;

transmitting Start of Frame (SOF) tokens to the USB external devices to enable the USB external devices to synchronize audio playback;

determining a buffered start time, relative to the SOF tokens for starting playback of the audio stream, the buffered start time comprising a current frame or microframe plus an additional time buffer, wherein the additional time buffer being a preset time unique to at least one or more of the detected USB external devices;

assigning audio mixing to the identified speakers in the USB external devices based on positions of the USB external devices in the tiled array, wherein the first speaker of the at least one USB external device is assigned a different audio mixing than the second speaker; and transmitting audio data during the buffered start time corresponding to the assigned audio mixing to the identified speakers in the USB external devices based on the assigned number of audio channels.

13. The method of claim 12, wherein said detecting the USB external devices over the port connections comprises removing all but the USB external devices that are configured to operate in a synchronous USB synchronization mode.

14. The method of claim 12, wherein at least one of the USB external devices is configured to play the audio stream at a deterministic time following the buffered start time.

15. The method of claim 12, wherein the additional time buffer being a preset time that is based a device identifier associated with one or more of the USB external devices.

16. The method of claim 15, wherein said detecting the USB external devices over the USB connections comprises:

retrieving USB Audio Class parameters from available USB external devices over the USB connections;

determining, from the retrieved USB Audio Class parameters, which of the available USB external devices are configured to operate in a synchronous USB synchronization mode; and selecting the available USB external devices that are configured to operate in the synchronous USB synchronization mode as the USB external devices.

17. The method of claim 12, further comprising:

detecting connection of one of the USB external devices to the USB host device;

transmitting USB Audio Class parameters from said one of the USB external devices to the USB host device;

receiving the SOF tokens from the USB host device;

determining a predetermined number of SOF tokens has been received by the USB external device; and incident to the predetermined number of SOF tokens being received, synchronize a slave clock to an SOF rate based corresponding to the SOF tokens received from the USB host device.

18. The method of claim 17, further comprising:
receiving, at the USB external device, audio data from the USB host device over a USB connection at the buffered start time; and
playing the audio data through one or more speakers at a deterministic time relative to the current time indicated by the slave clock.

19. The computer storage media of claim 17, wherein the USB external devices comprise one or more intelligent monitors, computing devices, multimedia hubs, multimedia projectors, stereo receivers, standalone wireless speakers, tablets, or televisions.

20. One or more computer storage media devices embodying computer-executable instructions for synchronizing audio played through speakers of universal serial bus (USB) external devices arranged in a tiled array that are individually connected to a computing device through port connections, the instructions comprising:

a speaker detector executable by at least one processor to detect the USB external devices over the port connections and identify the speakers of the USB external devices for synchronously playing an audio stream;

a rate synchronizer executable by the at least one processor to transmit Start of Frame (SOF) tokens to the USB external devices to enable the USB external devices to synchronize audio playback;

a time synchronizer computing a buffered start time, relative to the SOF tokens, for starting playback of the audio stream, the buffered start time comprising a current time of the master audio clock plus an additional time buffer, the additional time buffer being a preset time, unique to at least one or more of the detected USB external devices; and a playback synchronizer for assigning audio mixing to the identified speakers in the USB external devices based on positions of the USB external devices in the tiled array and transmitting audio data during the buffered start time corresponding to the assigned audio mixing to the identified speakers in the USB external devices, wherein the first speaker of the at least one USB external device is assigned a different audio mixing than the second speaker.

\* \* \* \* \*